May 4, 1943.                A. M. COHEN                 2,318,057
                  CONTROL DEVICE FOR FLUORESCENT LAMPS
                    Filed Jan. 11, 1940          3 Sheets-Sheet 1
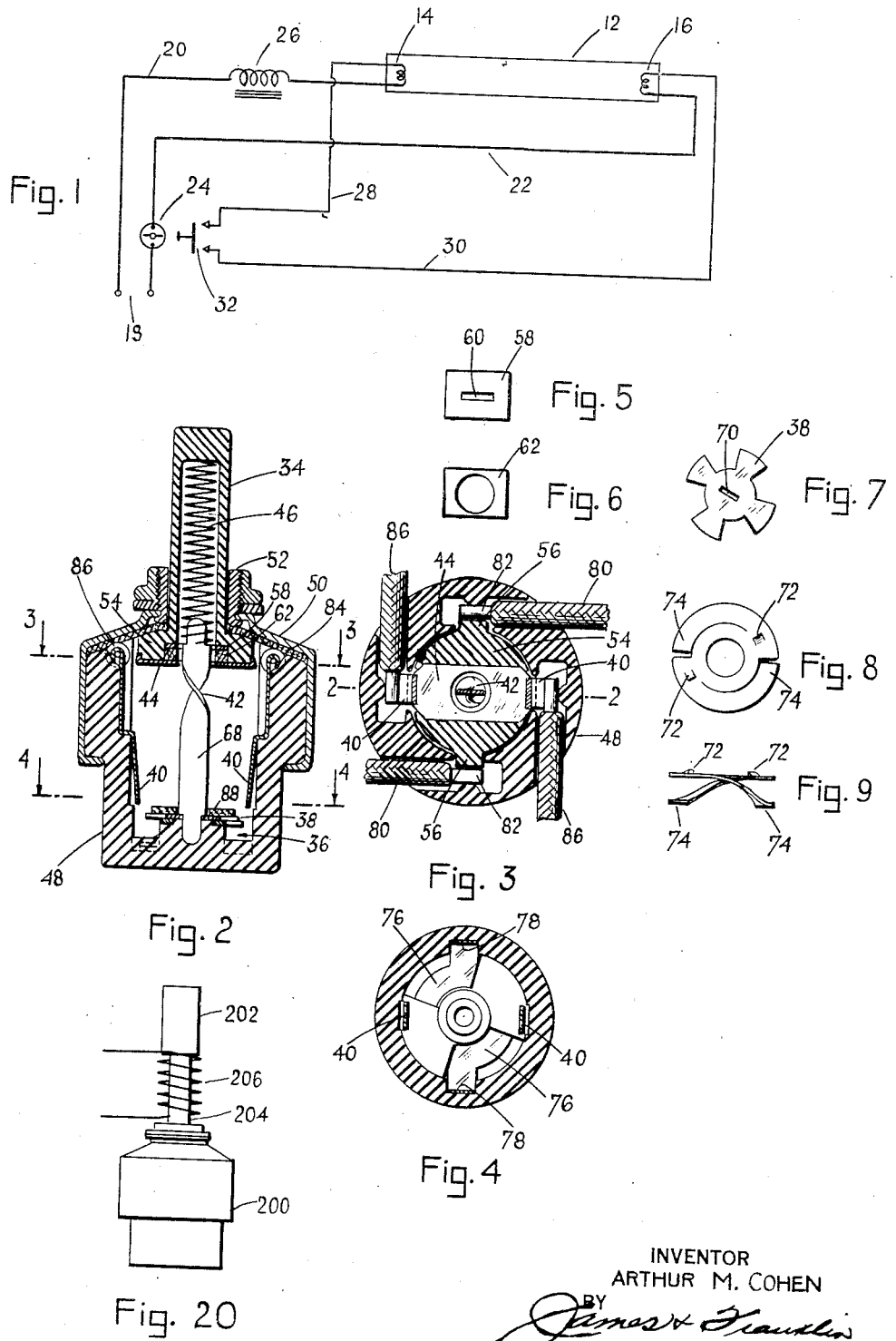
INVENTOR
ARTHUR M. COHEN
BY
James & Franklin
ATTORNEY May 4, 1943. A. M. COHEN 2,318,057
CONTROL DEVICE FOR FLUORESCENT LAMPS
Filed Jan. 11, 1940 3 Sheets-Sheet 2
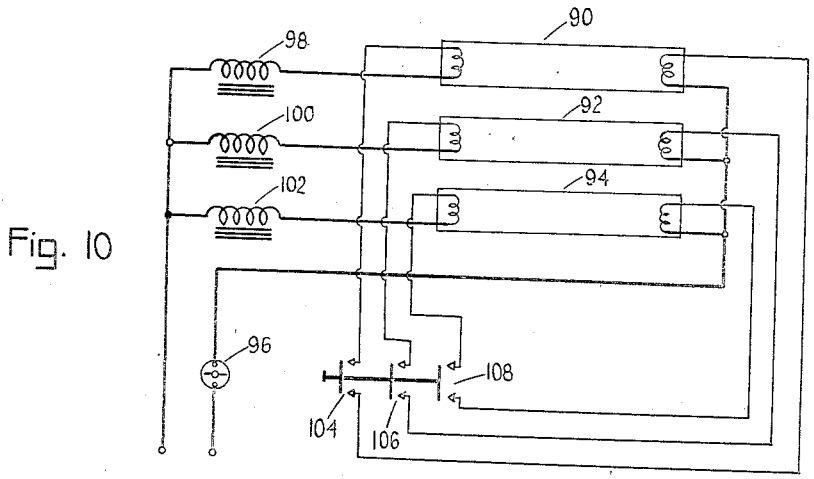
Fig. 10
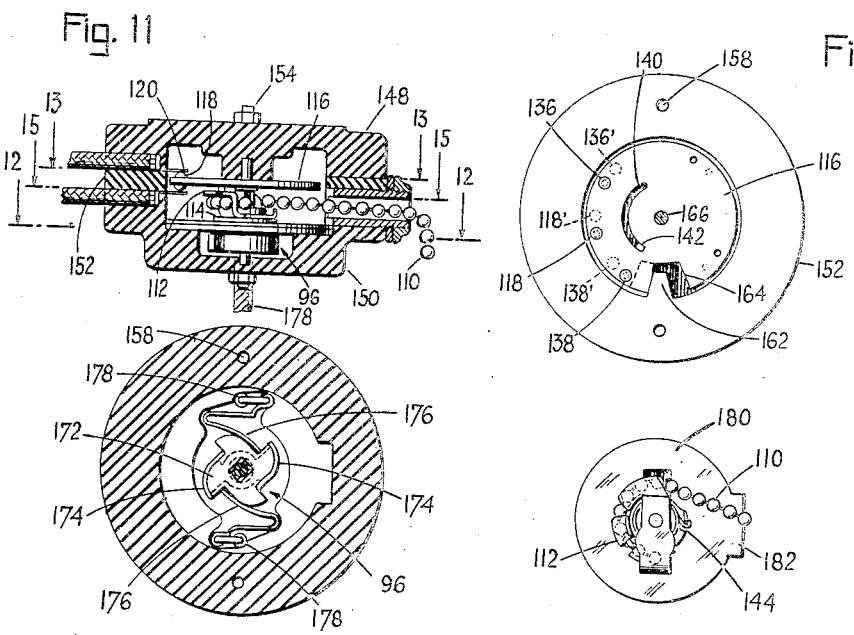
Fig. 11
Fig. 13
Fig. 12
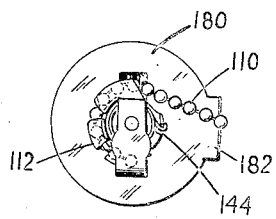
Fig. 14
INVENTOR
ARTHUR M. COHEN
BY
ATTORNEY May 4, 1943.                A. M. COHEN                2,318,057
                 CONTROL DEVICE FOR FLUORESCENT LAMPS
              Filed Jan. 11, 1940          3 Sheets-Sheet 3
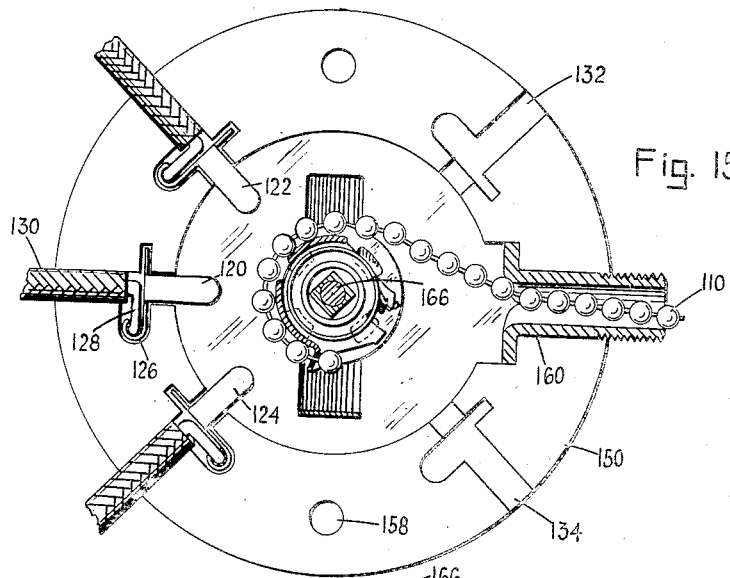
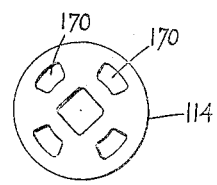
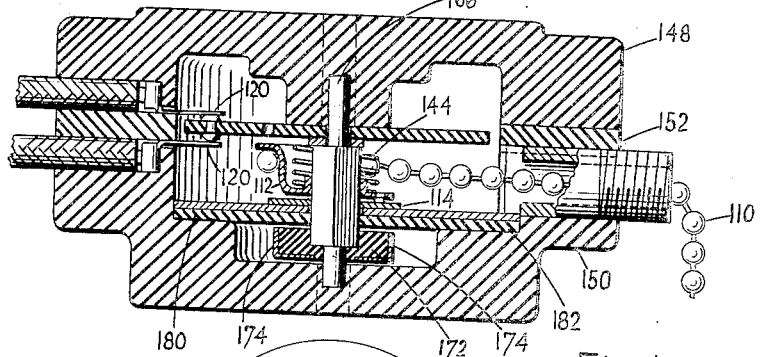
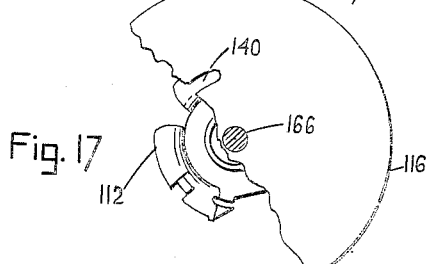
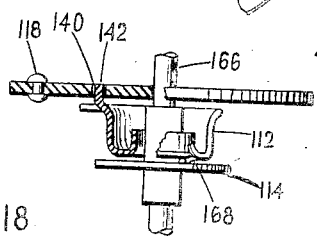
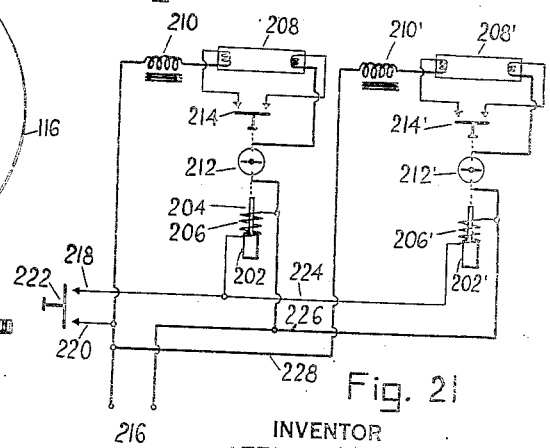
INVENTOR
ARTHUR M. COHEN
ATTORNEY Patented May 4, 1943

2,318,057

UNITED STATES PATENT OFFICE 2,318,057

CONTROL DEVICE FOR FLUORESCENT LAMPS

Arthur M. Cohen, New Rochelle, N. Y.

Application January 11, 1940, Serial No. 313,357

18 Claims. (Cl. 176—124)

This invention relates to fluorescent lamps, and more particularly to a control device used in combination therewith.

Fluorescent lamps are coming into wide and rapidly increasing use. These lamps ordinarily comprise an elongated bulb having mercury vapor and other gases to produce ultra-violet light which influences so-called "phosphors" coated on the inside of the bulb, causing the coating to luminesce. The main circuit for the lamp is applied across electrodes which are located at the ends of the bulb, and it is customary to use a ballast choke in this circuit. To facilitate starting, the electrodes are heated, as by making a part of the same in filamentary form and providing a starting circuit which runs through the filaments in series.

In accordance with prior practice the main lamp circuit is controlled by means of an ordinary snap switch, and the starting circuit is controlled by means of a special starter which closes the heating circuit for a short time after the main switch is closed. Some starters are of the thermal type, and these include a heating coil or resistor which remains in circuit. Other starters are of the magnetic type, and these generally include a relay coil which remains in circuit. In either case there is a waste of current. Other disadvantages are delay in starting; failure in restarting (immediately after extinguishing the lamp); the cost of the starter; and its comparative delicacy, leading to difficulty in maintenance.

The primary object of my invention is to generally improve fluorescent lamps by overcoming the foregoing disadvantages. A more particular object is to provide a wholly mechanical device in the nature of a simple control switch which functions to control both the main circuit and the starting circuit. Another object is to so construct the control device that it closely resembles ordinary snap switches, such as the plunger type, or the pull chain type.

Other objects are to provide a control device which is cheap, rugged, compact, and which provides dependable quick starting of the lamp. A still further object is to provide a single control device which may be used for a fluorescent lamp having a plurality of bulbs.

To the accomplishment of the foregoing and other objects which will hereafter appear, my invention consists in the lamp and control elements and their relation one to the other, as hereinafter are more particularly described in the specification and sought to be defined in the claims. The specification is accompanied by drawings, in which:

Fig. 1 is a wiring diagram for a lamp and control device embodying features of my invention;

Fig. 2 is a section taken axially through a control device of the plunger type;

Fig. 3 is a transverse section taken in the plane of the line 3—3 of Fig. 2;

Fig. 4 is a section taken in the plane of the line 4—4 of Fig. 2;

Figs. 5, 6, 7, 8 and 9 are explanatory of details of the construction;

Fig. 10 is a wiring diagram for a modification of the invention in which the lamp includes a plurality of bulbs;

Fig. 11 is a section through a modified switch of the pull chain type;

Fig. 12 is a section taken in the plane of the line 12—12 of Fig. 11;

Fig. 13 is a section taken in the plane of the line 13—13 of Fig. 11;

Fig. 14 is explanatory of the drum operated by the chain;

Fig. 15 is a section taken in the plane of the line 15—15 of Fig. 11, but drawn to enlarged scale;

Fig. 16 is a section generally similar to Fig. 11, but drawn to enlarged scale and showing the operating mechanism;

Figs. 17, 18 and 19 are explanatory of details of the construction;

Fig. 20 schematically illustrates a magnetically operated remotely controllable switch; and Fig. 21 is a wiring diagram showing the application of such a switch to a plurality of remote fixtures.

Referring to the drawings, and more particularly to Fig. 1, the fluorescent lamp comprises a suitable tubular glass envelope 12 having electrodes 14 and 16 sealed therein. The lamp is energized from an ordinary household lighting supply line indicated at 18. This is connected to electrode 14 by means of wire 20, and to electrode 16 by means of wire 22. The lamp circuit is controlled by a main control switch 24 which preferably operates like an ordinary commercial snap switch. A ballast choke 26 is connected in series with the lamps, as by inserting it in conductor 20 as here shown. The glass envelope 12 is coated on the inside with a suitable "phosphor" which responds to ultra-violet light generated within the tube by reason of the mercury vapor, and argon or other gases inside the tube.

To help start the lamp at the comparatively low potentials available, the electrodes 14 and 16 are heated. For this purpose, they are provided with filamentary portions which are connected in series with one another by means of conductors 28 and 30 terminating in the contacts of a switch 32. This switch need be closed for only a brief interval of time. To avoid confusion with the switch 24, the switch 32 is hereinafter referred to as a "starter."

For best operation the switch 24 should be actuated before the starter 32. For example, when extinguishing the lamp the switch 24 should be opened before the starter 32 can function to again heat the electrodes 14 and 16. The switch 24 preferably remains in either open or closed position, while the starter 32 is preferably closed only long enough for ignition of the lamp. Both the switch and the starter are most conveniently operated by a single manually operable element.

A control device operated by a push button or plunger is illustrated in Figs. 2 through 9 of the drawings. The device comprises a plunger 34, a snap switch generally designated 36, a ratchet device 38 between plunger 34 and the switch 36, starter contacts 40, and means to provide lost motion before the starter circuit is closed between said starting contacts 40. This means includes a spindle 42, one end of which is helically twisted, and the other end of which is straight. During the first part of the downward movement of the plunger the helical portion of the spindle is effective to turn the ratchet 38 and the snap switch 36. During the last part of the movement of the plunger, the spindle 42 does not rotate, but a metallic bridge element 44 is moved between the starter contacts 40 and so closes the starting circuit. When the plunger 34 is released it is moved upwardly by a return spring 46. This opens the starter circuit, but because of the ratchet action there is no change in the position of the snap switch 36. When the plunger is again depressed to extinguish the lamp, the main circuit is opened at the snap switch 36 before the bridging element 44 reaches the starter contacts 40.

Considering the arrangement in greater detail, the control device comprises a generally cylindrical housing 48 molded out of insulation. It is closed at the top by a metallic cap 50 carrying a bushing 52 in which the plunger 34 is slidable. The plunger is made of insulation material and is hollowed to receive the restoring spring 46. Its lower end is enlarged at 54 and is provided with projections or keys 56 (Fig. 3), which are slidable in the casing, and which prevent rotation of plunger 34.

The enlarged end 54 is provided with a rectangular recess which receives a metal plate 58 having a slot 60 in which the spindle 42 is slidable. A circularly apertured piece of insulation 62 is disposed beneath piece 60 and insulates the same from the bridging element 44. This is also circularly apertured so that it does not contact the spindle 42 (see Fig. 3). With the construction so far described, it will be evident that depression of plunger 34 produces a rotation of spindle 42 during the first part of the movement of the plunger. The comparatively long straight portion 68 acts in effect as a lost motion connection which affords time for operation of the starter.

The lower end of spindle 68 is received in a slot 70 (Fig. 7) in ratchet disc 38. The ratchet disc cooperates with ratchet teeth 72 (Figs. 8 and 9) on the upper surface of a rotatable snap switch element of conventional type. The depending contacts 74 cooperate with conventional sloping recesses formed in the bottom of casing 48 and make the movement of the switch element irreversible.

Referring now to Fig. 4 the snap switch further includes stationary contact segments 76 having ends or extensions 78 which are bent upwardly and extend axially of the casing to the upper end thereof where they are turned about and soldered to conductors or leads 80 (Fig. 3), as is indicated at 82. These conductors are connected into the main lamp circuit. They are received in appropriate slots or recesses at the top of the casing and are held in position by the metallic cap 50. An insulation liner 84 (Fig. 2) is disposed beneath the cap 50.

Additional conductors or leads 86 (Fig. 3) are provided at the top of the switch, these being connected into the starter circuit. The inner ends are appropriately connected or soldered to the upper ends of the starter contacts 40, previously referred to. In Fig. 2, it will be seen that the upper portions of the starter contacts 40 are stepped or displaced outwardly in order to bring the same well out of reach of the bridging element 44. In this way the circuit between the starter contacts 40 cannot be closed until the last portion of the stroke of the plunger 34. A disc of insulation 88 (Fig. 2) is disposed above the ratchet 38 to prevent the bridging element 44 of the starter circuit from contacting the ratchet 38 which is in the main lamp circuit. The insulation disc 88 therefore acts as a motion-limiting stop for the plunger 34.

It will be evident that the control device is simple, rugged and substantially foolproof. It will fail to function only if the plunger is pushed half way down and then released. However, in such case, the lamp will not light and the operator quickly learns to push the plunger all the way down. The lamp ignites quickly and the plunger may be released as soon as it has been pressed into the casing. However, I have found by observation that almost everyone depresses the plunger and tends to hold it in until he sees that the lamp has lighted. The switch is of particular value for the numerous installations where the switch is mounted directly on the lamp base or fixture and so forms a part of the lamp itself.

In many cases the complete lamp fixture may include a plurality of bulbs for increased illumination. Referring to Fig. 10, I there show a lamp comprising three bulbs 90, 92 and 94 all controlled by a single main switch 96. The operating characteristics of these bulbs necessitate that each be provided with its own ballast choke, and these are indicated at 98, 100 and 102. Similarly, the starting circuits must be independent of one another, and are here indicated as controlled by starters 104, 106 and 108, respectively. These are preferably operated simultaneously and in proper relation to the operation of the main switch 96.

A preferred construction for this purpose is illustrated in Figs. 11 through 19 of the drawings. The control device there shown is of the pull chain type, and comprises a pull chain 110 which extends into the casing and is adapted to be wound about a skeletonized drum 112. The main switch is a snap switch generally designated 96. A suitable ratchet device 114 is disposed between the drum 112 and the snap switch. In this respect the construction may be of conventional character. The present device differs in further including an insulation member 116 carrying one or more metallic bridging elements 118 adapted to bridge pairs of contacts forming a part of the starter previously referred to. Each pair of starter contacts 120 is disposed on opposite sides of the disc, as is best shown in Figs. 11 and 16. There are as many pairs of starter contacts as there are bulbs. Thus, in Fig. 15, there are three pairs of starter contacts numbered 120, 122, 124. These are held in appropriate slots or recesses and are provided with sidewardly bent parts 126 which are soldered to the ends 128 of suitable conductors or leads 130. In Fig. 15 it will be seen that two additional slots or recesses 132 and 134 are provided, thus making it possible to use the switch for a lamp having five bulbs. In fact, the switch may be used for lamps having anywhere from one to five bulbs by simply adding the necessary additional contacts.

Referring now to Fig. 13, the insulation member or disc 116 is provided with holes for five rivet-like bridging elements such as the element 118 previously referred to. In the present case there are three such bridging elements marked 118, 136 and 138, respectively, and intended for cooperation with the aforesaid three pairs of starter contacts 120, 122 and 124, respectively.

Disc 116 is provided with an arcuate slot 140. The drum 112 has a finger 142 (Fig. 18) struck upwardly therefrom, said finger being received in the slot 140. The slot acts as a lost-motion connection between the drum and the disc 116. When the chain is pulled, the drum is turned and changes the position of the snap switch 96. Near the end of the movement of the chain and after the snap switch has operated, the finger 118 reaches the end of slot 140 (Fig. 13) and so shifts the disc 116 to move the bridging elements between the starter contacts. When the chain is released the drum is turned in opposite direction by a conventional restoring spring 144 (Figs. 14 and 16). The snap switch remains unchanged because of the action of ratchet 114. The disc 116 remains unchanged until the finger 118 moves entirely through the lost-motion slot 140. At the end of the restoring movement of the drum the finger 118 reaches the end of the slot and shifts the disc to move the bridging elements away from the starter contacts. This automatically opens the starting circuits.

The present arrangement, besides making it possible to control a plurality of bulbs, has a further incidental advantage in increasing the minimum time during which the starter contacts are closed. This is so because of the effect of the lost-motion slot 140 which causes a delay in both directions. The construction here shown may, of course, be used with a single bulb, as well as with multiple bulbs.

Considering the construction in greater detail, the casing of the switch is made up of two molded circular parts 148 and 150 which are secured together in face to face relation with a ring 152 of insulation therebetween. The three parts are held together by appropriate screws 154 passing through holes 158. The lower part 150 is recessed, as shown in Fig. 15, to receive the lower contacts of the starters and the conductors leading thereto. This part of the casing also receives the bushing 160 through which the chain 110 passes. The other half 148 of the casing is similarly but oppositely recessed to receive the upper contacts of the starters. The wires and contacts are held in position by the ring 152 which closes all of the slots or recesses.

The ring 152 may, if desired, be provided with a stop finger 162 (Fig. 13) which cooperates with a recess 164 in the disc 116, thereby limiting the motion of the disc to the desired small amount. The position assumed by the bridging elements, when the disc is moved to opposite position, is shown in broken lines at 136', 118' and 138'.

The oscillatable parts turn about a central shaft 166. The round ends of this shaft are received in mating sockets in the upper and lower parts of the casing. The center portion of the shaft is squared, and the ratchet disc 114, best shown in Fig. 19, is non-rotatably received over the square shaft. The hole in the drum 112 is so large in diameter that the drum is rotatable about the square shaft. The drum has one or more teeth 168 (Fig. 18) struck downwardly therefrom, said teeth cooperating with mating holes 170 (Fig. 19) in ratchet disc 114. At its lower end the shaft carries a cam-shaped switch element 172, the configuration of which is best shown in Fig. 12. This has four parts, two of which are provided with metal flanges 174 formed at the edges of a bridging piece extending across the bottom of the insulation member 172. The member 172 cooperates with spring contacts 176 (Fig. 12), the ends of which are received in appropriate recesses and are soldered to the ends of the main leads 178. In the position shown in Fig. 12 the switch is open, for the spring contacts 176 bear against the insulation parts of member 172. When, however, the member 172 is turned through a quarter revolution the contacts 176 bear against the metallic parts 174, and the main circuit is closed. Reverse movement of member 172 is prevented by the ratchet shape of the relatively movable parts.

The drum 112 is formed out of a single piece of sheet metal and is provided with appropriate means of conventional character for receiving and anchoring the endmost ball of the chain 110. The drum and associated ratchet mechanism are mounted on a plate 180, best shown in Fig. 14. Rotation of this plate is prevented by a projection 182 which is received in a mating part of the casing.

The main circuit switch or snap switch described above has been illustrated as a single pole switch. It will be understood, however, that this may equally well be a double pole switch, the latter being preferred, and in some cases required when the circuit is a 220 volt, instead of a 110 volt circuit.

In the foregoing description the driving element which causes the mechanical movement of the lamp control device has been referred to as a manually operable element, but it should be understood that this may be any movable element, whether moved directly by hand, or indirectly, as through the medium of a relay or solenoid. Specifically, an overhead fixture may be controlled by a wall switch, when a pull cord hanging from the fixture is not desirable. In such case a control device generally like those described above may be installed in the fixture, but arranged to be operated by a solenoid core influenced by a solenoid which in turn is controlled by a circuit running to the wall switch. The wall switch is preferably a push button or momentary contact switch of any suitable type, rather than a switch which remains either closed or open. Each momentary contact provided at the wall switch will cause a single operation at the control device, involving the main circuit switch and the starter. The standard wiring already present in the walls of the building and extending from the overhead fixture to the wall switch may be retained and used for this new purpose, the original wall switch being converted, of course, to a momentary contact switch, or push-button switch, or equivalent.

Referring now to Fig. 20, the switch 200 there shown has an iron core 202 connected to the upper end of the insulation plunger 204 of a switch which is otherwise exactly like that shown in Fig. 2. A solenoid coil 206 is disposed between the iron core 202 and the switch body 200, and is adapted when energized to draw the core 202 downwardly, thereby actuating the switch.

Referring now to Fig. 21, a lamp 208 is provided with a choke 210 and a control device including a switch 212 and starter 214, all as was previously described. These are actuated by plunger 204 under the influence of solenoid coil 206 acting on iron core 202. An ordinary 110 volt A. C. power supply is indicated at 216. The lamp 208 may be an overhead or ceiling lamp, and the choke 210 and control device 206, 212, 214 are located at the lamp. A pair of conductors 218, 220 run to a suitable remote control switch 222. This may be a push-button switch or momentary contact switch of any suitable character. It may be located in the usual position for a wall switch controlling the overhead lamp. This remote control arrangement permits several ceiling fixtures or other remote fixtures to be controlled from a single wall switch or other remote switch. Each ceiling fixture is provided with a solenoid-operated control device, as above explained, all of said solenoids being connected to the single remote switch.

Thus, in Fig. 21, the lamp 208′, choke 210′, switch 212′ and starter 214′, as well as the solenoid 206′ and core 202′, all correspond to the similarly numbered parts previously described. Only three wires need be run through the ceiling from fixture to fixture, these being the wires indicated at 224, 226 and 228. It will be understood that operation of button 222 energizes the solenoids of all of the control devices, thereby starting all of the lamps. Another operation of button 222 again energizes the solenoids of all of the control devices and so extinguishes the lamps.

It is believed that the construction and operation, as well as the many advantages of my improved control device for lamps will be apparent from the foregoing detailed description thereof. In the appended claims, I have referred to the device as controlling a fluorescent lamp, but it will be understood that this is intended to include control of a vapor lamp, broadly, for the vapor lamp may be essentially the same in respect to the electrodes, it differing primarily in the omission of the fluorescent coating on the inside of the glass bulb. It will also be apparent that while I have shown and described my invention in several preferred forms, many changes and modifications may be made in the structures disclosed without departing from the spirit of the invention as sought to be defined in the following claims.

I claim:

1. A device for the control of a fluorescent lamp, said device comprising a movable element, a switch having open and closed positions, a ratchet device between said element and said switch whereby each operation of the element changes the switch from open to closed position or vice versa, an auxiliary starter switch insulated from the switch and arranged for brief contact, and means whereby the switch is operated during the first part of the movement of the element, and the auxiliary starter switch is operated during the last part of the movement of the element.

2. A device for the control of a fluorescent lamp, said device comprising a movable element, a return spring for said element, a snap switch having open and closed positions, a ratchet device between said element and said switch whereby each operation of the element changes the switch from open to closed position or vice versa, an auxiliary starter switch insulated from the switch and arranged for brief contact, and a lost motion connection between said element and said auxiliary starter whereby the switch is operated during the first part of the movement of the element, and the auxiliary starter switch is operated during the last part of the movement of the element.

3. In combination, a fluorescent lamp having spaced electrodes, a main circuit connected to said electrodes, a normally open starting circuit so connected as to cause heating of the electrodes to start the lamp, and a device for controlling the lamp, said device comprising a movable element, a switch connected in and controlling the main lamp circuit, a ratchet device between said element and said switch, an auxiliary starter switch insulated from the switch and arranged for brief contact, said auxiliary starter switch being connected in and controlling said starting circuit, and means whereby the switch is operated during the first part of the movement of the element, and the auxiliary starter is operated during the last part of the movement of the element.

4. In combination, a fluorescent lamp having spaced electrodes, a main circuit including a ballast choke connected to said electrodes, a normally open starting circuit connected to filamentary portions of said electrodes for heating the same to start the lamp, and a wholly mechanical device for controlling the lamp, said device comprising a manually operable element, a return spring for said element, a snap switch connected in and controlling the main lamp circuit, a ratchet device between said element and said switch, an auxiliary starter switch insulated from the switch and arranged for brief contact, said auxiliary starter switch being connected in and controlling said starting circuit, and a lost motion connection between said element and said auxiliary starter switch whereby the switch is operated during the first part of the movement of the element, and the starter switch is operated during the last part of the movement of the element.

5. A device for the control of a fluorescent lamp, said device comprising a housing, a longitudinally depressible plunger projecting from said housing, a snap switch in said housing having open and closed positions, means including a ratchet whereby depression of the plunger operates the switch during the first part of the movement of the plunger, the arrangement being such that each operation of the element changes the switch from open to closed position or vice versa, a return spring for said plunger, auxiliary starter switch contacts disposed at the sides of said housing near but insulated from the snap switch, and bridge means on the lower end of said plunger for connecting said auxiliary starter switch contacts when the plunger is depressed, the arrangement being such that the snap switch is operated during the first part of the movement of the plunger, and the auxiliary starter switch is operated during the last part of the movement of the plunger.

6. A device for the control of a fluorescent lamp, said device comprising a housing, a longitudinally depressible plunger projecting from said housing, a snap switch in said housing, a ratchet associated with said snap switch, a spindle extending between the ratchet and the plunger, one end of said spindle being helically twisted and the other end being straight, whereby depression of the plunger rotates the ratchet during the first part of the movement of the plunger, a return spring for said plunger, auxiliary starter switch contacts disposed in said housing remote from the plunger, and bridge means on the lower end of said plunger for connecting said auxiliary starter contacts when the plunger switch is depressed, the arrangement being such that the snap switch is operated during the first part of the movement of the plunger, and the auxiliary starter is operated during the last part of the movement of the plunger.

7. A device for the control of a fluorescent lamp, said device comprising a generally cylindrical housing, a longitudinally depressible plunger at one end of said housing, a snap switch disposed at the opposite end of the housing, a ratchet associated with said snap switch, a spindle extending axially through the housing between the ratchet and the plunger, the end of said spindle near the plunger being helically twisted and the end of said spindle near the snap switch being straight, means whereby depression of the plunger rotates the spindle and consequently the ratchet during the first part of the movement of the plunger, a return spring housed in said plunger between the upper end of the spindle and the top of the plunger, auxiliary starter switch contacts disposed at the sides of said housing near but insulated from the snap switch, and bridge means on the lower end of said plunger for connecting said auxiliary starter switch contacts when the plunger is depressed, the arrangement being such that the snap switch is operated during the first part of the movement of the plunger, and the auxiliary starter switch is operated during the last part of the movement of the plunger.

8. In combination, a fluorescent lamp having spaced electrodes, a main circuit connected to said electrodes, a normally open starting circuit so connected as to cause heating of the electrodes to start the lamp, and a device for controlling the lamp, said device comprising a housing, a longitudinally depressible plunger projecting from said housing, a snap switch in said housing for controlling the main lamp circuit, a ratchet associated with said snap switch, a spindle extending between the ratchet and the plunger, one end of said spindle being helically twisted and the other end being straight, whereby depression of the plunger rotates the ratchet during the first part of the movement of the plunger, a restoring spring for said plunger, auxiliary starter switch contacts disposed in said housing remote from the plunger, said contacts being connected in and controlling the aforesaid starting circuit, and bridge means on the lower end of the plunger for connecting said auxiliary starter switch contacts when the plunger is depressed, the arrangement being such that the snap switch is operated during the first part of the movement of the plunger, and the auxiliary starter switch is operated during the last part of the movement of the plunger.

9. In combination, a fluorescent lamp having spaced electrodes, a main circuit including a ballast choke connected to said electrodes, a normally open starting circuit connected to filamentary portions of said electrodes for heating the same to start the lamp, and a wholly mechanical device for controlling the lamp, said device comprising a generally cylindrical housing, a longitudinally depressible plunger at one end of said housing, a snap switch disposed at the opposite end of the housing and connected in and controlling the main lamp circuit, a ratchet associated with said snap switch, a spindle extending axially through the housing between the ratchet and the plunger, the end of said spindle near the plunger being helically twisted and the end of said spindle near the snap switch being straight, means whereby depression of the plunger rotates the spindle and consequently the ratchet during the first part of the movement of the plunger, a restoring spring housed in said plunger between the upper end of the spindle and the top of the plunger, auxiliary starter switch contacts disposed at the sides of said housing near but insulated from the snap switch, said contacts being connected in and controlling the aforesaid starting circuit, and bridge means on the lower end of the plunger for connecting said auxiliary starter switch contacts when the plunger is depressed, the arrangement being such that the snap switch is operated during the first part of the movement of the plunger, and the auxiliary starter switch is operated during the last part of the movement of the plunger.

10. A device for the control of a fluorescent lamp, said device comprising a casing, a pull chain extending into said casing, a drum, the inner end of said chain being connected to said drum, a restoring spring connected to said drum for normally winding the chain about the drum, a snap switch in said casing, ratchet means between said drum and said switch, an auxiliary starter switch comprising a movable member controlling a pair of contacts, and a lost-motion connection between said chain and said member, the arrangement being such that the chain moves without moving the member during the first part of the movement of the chain, but moves the member to close the contacts during the last part of the movement of the chain, said member remaining stationary because of said lost-motion connection and said contacts remaining closed during return of the chain by the restoring spring until near the end of the return movement of the chain, whereupon the member is again moved to initial position, thereby opening the contacts.

11. A device for the control of a fluorescent lamp, said device comprising a casing, a shaft disposed axially in said casing, a flexible pull chain extending into said casing, a drum freely oscillatable about said shaft under the influence of said chain, the inner end of said chain being connected to said drum, a restoring spring connected to said drum for normally winding the chain about the drum, a snap switch in said casing, ratchet means between said drum and said snap switch, an auxiliary starter switch comprising an insulation disc oscillatable about said shaft, a pair of contacts on opposite sides of said disc, a bridging element carried by said disc for bridging said contacts, an arcuate slot in said disc, a finger extending from said drum through said slot, the arrangement being such that the finger moves idly through the slot during the first part of the movement of the chain, but engages the end of the slot and so moves the disc to bring the bridging element to the contacts during the last part of the movement of the chain, said contacts remaining bridged because of said slot and finger during return of the chain by the restoring spring until near the end of the return movement of the chain, whereupon the disc is again moved to initial position, thereby removing the bridging element from the contacts.

12. In combination, a fluorescent lamp comprising a bulb having spaced electrodes, a main circuit for energizing said bulb, a normally open starting circuit so connected as to heat the electrodes to start the lamp, and a device for controlling the lamp, said device comprising a casing, a flexible pull chain extending into said casing, a drum, the inner end of said chain being connected to said drum, a restoring spring connected to said drum for normally winding the chain about the drum, a snap switch in said casing, said snap switch being connected in and controlling the main lamp circuit, ratchet means between said drum and said snap switch, an auxiliary starter switch comprising a movable insulation member controlling a pair of contacts, a lost-motion connection between said chain and said member, the arrangement being such that the chain moves without moving the member during the first part of the movement of the chain, but moves the member to close the contacts during the last part of the movement of the chain, said member remaining stationary because of said lost-motion connection and said contacts remaining closed during return of the chain by the restoring spring until near the end of the return movement of the chain, whereupon the member is again moved to initial position, thereby opening the contacts and the starting circuit.

13. In combination, a fluorescent lamp comprising a bulb having spaced electrodes, a ballast choke connected in series with the bulb, a main circuit for energizing said bulb, a normally open starting circuit connected to filamentary portions of said electrodes for heating the same to start the lamp, and a wholly mechanical device for controlling the lamp, said device comprising a casing, a shaft in the casing, a manually operable pull chain extending into said casing, a drum freely oscillatable about said shaft under the influence of said chain, the inner end of said chain being connected to said drum, a restoring spring connected to said drum for normally winding the chain about the drum, a snap switch in said casing, said snap switch being connected in and controlling the main lamp circuit, ratchet means between said drum and said snap switch, an auxiliary starter switch comprising an insulation disc oscillatable about said shaft, a pair of contacts disposed on opposite sides of the disc and connected in and controlling said starting circuit, a bridging element carried by said disc for bridging the pair of contacts, an arcuate slot in said disc, a finger extending from said drum through said slot, the arrangement being such that the finger moves idly through the slot during the first part of the movement of the chain, but engages the end of the slot and so moves the disc to bring the bridging element to the contacts during the last part of the movement of the chain, said contacts remaining bridged because of said slot and finger during return of the chain by the restoring spring until near the end of the return movement of the chain, whereupon the disc is again moved to initial position, thereby removing the bridging element from the contacts and so opening the starting circuit.

14. In combination, a fluorescent lamp comprising a plurality of bulbs each having spaced electrodes, a main circuit for energizing said bulbs in parallel, a normally open starting circuit for each bulb, said starting circuits being so connected as to heat the electrodes to start the lamp, and a device for controlling the lamp, said device comprising a casing, a manually operable pull chain extending into said casing, a drum, the inner end of said chain being connected to said drum, a restoring spring connected to said drum for normally winding the chain about the drum, a snap switch in said casing, said snap switch being connected in and controlling the main lamp circuit, ratchet means between said drum and said snap switch, an auxiliary starter switch comprising a movable insulation member, a plurality of pairs of contacts, the contacts of each pair being disposed on opposite sides of the member and being connected in and controlling one of said starting circuits, a plurality of bridging elements carried by said member for bridging each pair of contacts, a lost-motion connection between said chain and said member, the arrangement being such that the chain moves without moving the member during the first part of the movement of the chain, but moves the member to close the contacts during the last part of the movement of the chain, said contacts remaining closed because of said lost-motion connection during return of the chain by the restoring spring until near the end of the return movement of the chain, whereupon the member is again moved to initial position, thereby opening the contacts and the starting circuits.

15. In combination, a fluorescent lamp comprising a plurality of bulbs each having spaced electrodes, a separate ballast choke connected in series with each bulb, a main circuit for energizing said series circuits in parallel, a normally open starting circuit for each bulb, said starting circuits being connected to filamentary portions of said electrodes for heating the same to start the lamp, and a wholly mechanical device for controlling the lamp, said device comprising a casing, a shaft in the casing, a manually operable pull chain extending into said casing, a drum freely oscillatable about said shaft under the influence of said chain, the inner end of said chain being connected to said drum, a restoring spring connected to said drum for normally winding the chain about the drum, a snap switch in said casing, said snap switch being connected in and controlling the main lamp circuit, ratchet means between said drum and said snap switch, an auxiliary starter switch comprising an insulation disc oscillatable about said shaft, a plurality of pairs of contacts, the contacts of each pair being disposed on opposite sides of the disc and being connected in and controlling one of said starting circuits, a plurality of bridging elements carried by said disc for bridging each pair of contacts, an arcuate slot in said disc, a finger extending from said drum through said slot, the arrangement being such that the finger moves idly through the slot during the first part of the movement of the chain, but engages the end of the slot and so moves the disc to bring the bridging elements to their respective contacts during the last part of the movement of the chain, said contacts remaining bridged because of said slot and finger during return of the chain by the restoring spring until near the end of the return movement of the chain, whereupon the disc is again moved to initial position, thereby removing the bridging elements from the contacts and so opening the starting circuits.

16. A device for the remote control of a fluorescent lamp, said device comprising a movable element, a switch having open and closed positions, a ratchet device between said element and said switch whereby each operation of the element changes the switch from open to closed position or vice versa, an auxiliary starter switch insulated from the switch and arranged for brief contact, means whereby the switch is operated during the first part of the movement of the element, and the auxiliary starter switch is operated during the last part of the movement of the element, magnetic means for moving said element, a remote switch of the normally open type, and a circuit extending between said switch and said magnetic means for momentarily energizing the magnetic means.

17. In combination, a plurality of fluorescent lamps each having spaced electrodes, a main circuit connected to said electrodes, a normally open starting circuit so connected as to cause heating of the electrodes to start the lamp, and a control device comprising a movable element, a switch connected in and controlling the main lamp circuit, a ratchet device between said element and said switch, an auxiliary starter switch insulated from the switch and arranged for brief contact, said auxiliary starter switch being connected in and controlling said starting circuit, means whereby the switch is operated during the first part of the movement of the element and the auxiliary starter switch is operated during the last part of the movement of the element, and magnetic means for moving said movable element, a single remote control switch of the normally open type, and a circuit extending between said switch and all of said magnetic means for simultaneously momentarily energizing said magnetic means.

18. A device for the control of a vapor lamp, said device comprising a movable element, a switch having open and closed positions, a starter insulated from the switch and arranged for brief contact, and means whereby the switch is operated during the first part of the movement of the element and the starter is operated during the last part of the movement of the element, the arrangement being such that each operation of the element changes the switch from open to closed position or vice versa.

ARTHUR M. COHEN.